Patented Jan. 8, 1929.

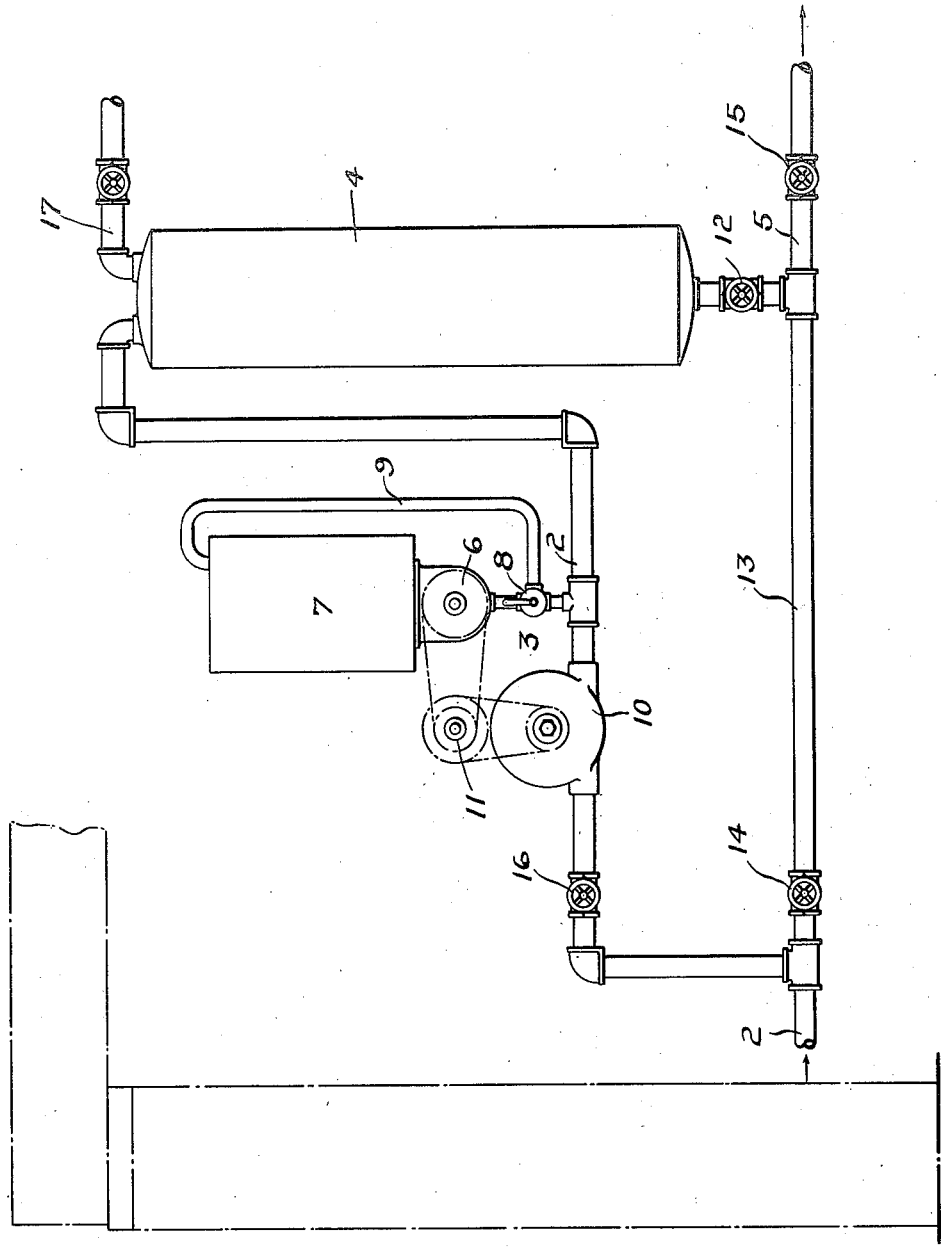

1,698,537

UNITED STATES PATENT OFFICE.

CHARLES B. CUSHWA, OF YOUNGSTOWN, OHIO.

METHOD AND APPARATUS FOR TREATING LIQUIDS.

Application filed October 8, 1926. Serial No. 140,293.

This invention relates to a method and apparatus for treating liquids, and is particularly adapted for use in a water softening system.

This application is a continuation of my co-pending application Serial No. 104,658.

The present invention relates more especially to a liquid treating method and apparatus wherein the treating substance is supplied in quantities varying in accordance with the demand for treated liquid.

The present invention is characterized by the provision of an improved apparatus supplying treating material to the raw liquid and removing any solid particles which may be present in the treated liquid due to precipitation or other cause.

The invention will be described with particular reference to a liquid treating system wherein the treating material is in the form of a solution, or liquid suspension, but it will be understood that the invention contemplates the use of treating materials in other forms, such as finely divided solids.

My improved water treating apparatus is diagrammatically illustrated as applied to a domestic water supply.

Referring to the illustrated embodiment, there is shown a liquid conduit 2 adapted for conducting the untreated liquid to a treating material supply means indicated generally at 3. From the treating material supply means the treated liquid is conducted through a filter 4, to a treated water supply main 5.

As shown in the drawing, the treating material supply means comprises a pump 6 adapted to receive treating material from a reservoir 7, supplying the treating material to a 3-way cock 8, from whence the treating material may be led to the conduit 2, or bypassed through a pipe 9 back to the reservoir 7. The pump 6 is preferably driven by a suitable water motor 10 in the conduit 2, the drive being effected through suitable speed reducing mechanism 11.

By choosing a suitable speed ratio between the pump 6 and the motor 10, an excess of treating material may be supplied to the 3-way cock 8 so that regulation is effected by means of the bypass 9, more or less treating material being bypassed as conditions require.

The filter 4 may be of the usual sand filter type in which a mass of sand is retained on a foraminous support, as is well understood in the art.

The treated liquid enters the top of the filter and is withdrawn from the bottom through a suitable valve 12.

A conduit 13 connects the inlet conduit 2 with the treated water main 5, but is normally closed by a valve 14. A similar valve 15 in the outlet 5 is normally open, as is a valve 16 in the inlet conduit 2. When it is desired to clean the filter, however, the valves 15 and 16 may be closed and the valve 14 opened, whereupon water will flow into the filter from the bottom and may be withdrawn therefrom through a suitable valved cleanout pipe 17. The conduit 13 may also be used as a bypass around the water treating apparatus if so desired.

It will be apparent from the drawings that under normal conditions any withdrawal of treated liquid causing flow in the conduit 2 will result in the motor 10 actuating the pump 6 to supply treating material to the liquid in the conduit 2. The amount of treating material actually supplied to the conduit 2 may be varied by suitably adjusting the 3-way cock, as above stated.

Obviously the ratio of the speeds of the pump and motor depends upon a number of factors, such as the size of the pump, the rate of flow in the conduit 2, and the concentration of the treating material. It will be understood, therefore, that any suitable driving mechanism giving the desired ratio may be employed to connect the motor and the pump. Any slip in the pump, or changes in concentration of the treating material may be compensated for by adjusting the 3-way cock.

The present system is particularly adapted for use as a water softener means for domestic use. The action of the softening chemical ordinarily employed is to precipitate dissolved calcium and magnesium salts and like water hardening compounds in the form of a finely divided precipitate. The function of the filter in the present system is to remove such precipitated matter and also any solid particles present in the water.

It will thus be seen that my improved liquid treating apparatus may be employed to supply clean soft water from any water from which the hardening substances may be precipitated by chemical action at the ordinary temperatures encountered. The invention further contemplates the addition of any desired elements to water deficient in the same, such as iodine which may be introduced into the water in any desired amount. It may also be desirable to add such substances as alum or iron to give the water a "natural" taste, and thereby remove any objectionable flatness observed in pure waters.

Thus I provide an improved liquid treating apparatus adapted to receive untreated liquid, supply treating chemical thereto, and separate out any sludge or precipitate resulting from such chemical treatment, thereby yielding a treated liquid of desired chemical characteristics and free from suspended matter.

While I have illustrated and described an apparatus for use as a water softening system, it will be understood that the invention is not limited thereto, as changes may be made in the construction and operation disclosed therein within the scope of the following claims.

I claim:

1. Liquid treating apparatus including a conduit, a source of treating material, a motor actuated by liquid flowing through the conduit, a pump operable by the motor for introducing treating material into the conduit, manually operable means for bypassing a portion of the treating material around the conduit, thereby varying the proportion of treating material supplied.

2. Liquid treating apparatus including a conduit, a source of treating material, a motor actuated by liquid flowing through the conduit, a pump operable by the motor for introducing treating material into the conduit, manually operable means for bypassing a portion of the treating material around the conduit to the treating material source, and filter means adapted to remove suspended matter from the treated liquid.

3. In the method of treating liquid the steps comprising causing the flow of the liquid, utilizing the liquid flow to cause the flow of treating material in a conduit communicating with the liquid, the flow of the treating material being in proportion to the liquid flow, and bypassing the treating material away from the liquid, thereby determining the proportion of treating material added to the liquid, and removing suspended matter from the treated liquid.

In testimony whereof I have hereunto set my hand.

CHARLES B. CUSHWA.